United States Patent [19]

Uda et al.

[11] Patent Number: 4,689,075
[45] Date of Patent: Aug. 25, 1987

[54] PROCESS FOR PRODUCING MIXED ULTRAFINE POWDER OF METALS OR CERAMICS

[75] Inventors: Masahiro Uda, Tokyo; Satoru Ohno, Kiyose, both of Japan

[73] Assignee: National Research Institute for Metals, Tokyo, Japan

[21] Appl. No.: 784,304

[22] Filed: Oct. 4, 1985

[30] Foreign Application Priority Data

Oct. 16, 1984 [JP] Japan .................. 59-215237

[51] Int. Cl.⁴ ............................................... C22C 1/04
[52] U.S. Cl. ............................. 75/0.5 B; 75/0.5 BA; 75/0.5 BB; 264/5; 264/9; 264/10
[58] Field of Search ........... 75/0.5 B, 0.5 BA, 0.5 BB, 75/0.5 BC; 264/10, 9, 5

[56] References Cited

U.S. PATENT DOCUMENTS

| | | | |
|---|---|---|---|
| 3,992,193 | 11/1976 | Fey et al. | 75/0.5 BB |
| 4,266,977 | 5/1981 | Steiger | 75/238 |
| 4,282,195 | 8/1981 | Hoekje | 423/289 |
| 4,482,134 | 11/1984 | Uda et al. | 266/200 |
| 4,518,425 | 5/1985 | Wynnyckyj | 75/67 R |
| 4,526,612 | 7/1985 | Eriksson et al. | 75/129 |

Primary Examiner—Stephen J. Lechert, Jr.
Attorney, Agent, or Firm—Wenderoth, Lind & Ponack

[57] ABSTRACT

A process for producing a mixed ultrafine powder, which comprises reacting at least two metals or ceramics in the molten state with hydrogen, nitrogen, oxygen, a mixture of hydrogen and nitrogen or a mixture of nitrogen and oxygen. Each said gas or gaseous mixture being activated with a hot plasma, in an atmosphere of hydrogen gas, nitrogen gas, oxygen gas, a gaseous mixture of hydrogen and nitrogen, a gaseous mixture of nitrogen and oxygen, or a gaseous mixture of any of said gases with an inert gas under a pressure of 50 torr to 3 atmospheres to form ultrafine particles of said at least two metals or ceramics afloat in the atmospheric gas, and thereafter mixing the floating ultrafine particles of the metals or ceramics by a gas current.

3 Claims, 8 Drawing Figures

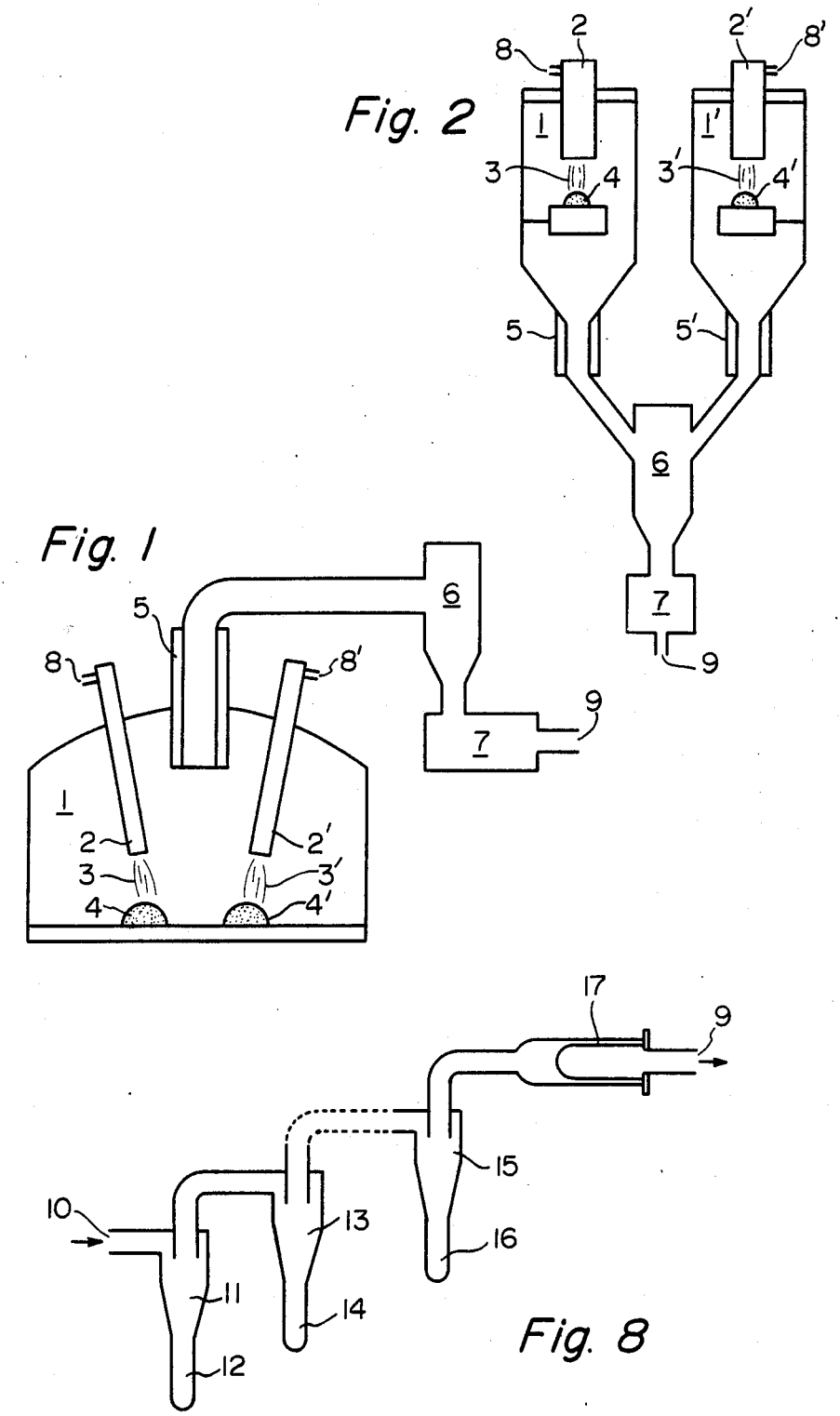

PROCESS FOR PRODUCING MIXED ULTRAFINE POWDER OF METALS OR CERAMICS

This invention relates to a process for producing a mixed ultrafine powder comprising a uniform mixture of ultrafine particles of metals or ceramics (nitrides, oxides, carbides, etc of metals) having a particle diameter of not more than 1 micrometer.

Ultrafine particles of metals or ceramics have various superior properties such as electromagnetic properties, optical properties, catalytic activity, sinterability and chemical reactivity, and attempts have been made to exploit various practical applications for these ultrafine particles by utilizing their superior properties. Mixing of ultrafine particles of dissimilar substances not only can bring about synergistically improved properties, but also can be expected to lead to the development of materials having new functions.

Ultrafine particles are very liable to agglomerate, and the agglomerated particles (primary agglomerated particles) are hardly broken by mechanical means. Hence, mixing of ultrafine particles of dissimilar substances tends to result in a mixture of primary agglomerated particles, and it has previously been extremely difficult to obtain a uniform mixture of ultrafine particles.

It is an object of this invention to overcome the aforesaid difficulty, and to provide a process for easily producing a uniform mixture of ultrafine particles free from primary agglomerated particles.

The present inventors previously developed new processes for producing ultrafine particles of metals or ceramics having a particle diameter of not more than 1 micrometer by utilizing a hot plasma (see U.S. Pat. No. 4,376,740, and Japanese Laid-Open Patent Publications Nos. 57904/1984 and 227765/1984). Briefly stated, these processes involve generating a hot plasma in hydrogen, nitrogen or oxygen under atmospheric pressure or pressures in its vicinity or a mixture thereof with an inert gas such as Ar or He, heat-melting a metal or a ceramic (a metal nitride, oxide, carbide, etc.) with the hot plasma, and reacting the molten metal or ceramics with hydrogen, nitrogen or oxygen activated in the hot plasma thereby producing ultrafine particles of the metal or ceramic.

Thus, a more specific object of this invention is to produce a uniform mixture of ultrafine particles of two or more metals or ceramics by utilizing hot plasmas as stated above.

According to this invention, there is provided a process for producing a mixed ultrafine powder, which comprises reacting at least two metals or ceramics in the molten state with hydrogen, nitrogen, oxygen, a mixture of hydrogen and nitrogen or a mixture of nitrogen and oxygen. Each said gas or gaseous mixture being activated with a hot plasma, in an atmosphere of hydrogen gas, nitrogen gas, oxygen gas, a gaseous mixture of hydrogen and nitrogen, a gaseous mixture of nitrogen and oxygen, or a gaseous mixture of any of said gases with an inert gas under a pressure of 50 torr to 3 atmospheres to form ultrafine particles of said at least two metals or ceramics afloat in the atmospheric gas, and thereafter mixing the floating ultrafine particles of the metals or ceramics by a gas current.

When ultrafine particles are produced by utilizing a hot plasma in an atmosphere having a relatively high density (about 50 torr to 3 atmosphere), the kinetic energy of the ultrafine particles formed from molten metals or ceramics is reduced by the atmospheric gases as soon as they are formed. Consequently, the ultrafine particles exist afloat in the atmospheric gas like a kind of aerosol. The ultrafine paricles in this state are in the highly dispersed state with hardly any primary agglomeration. Ultrafine particles in such a state can be easily mixed uniformly with other ultrafine particles floating in the gas by agitating them with a gas current. The ultrafine particles recovered from the atmosphere where the gas-current mixing has been performed are a uniform mixture of the ultrafine particles free from primary agglomerated particles. Thus, according to the process of this invention, a uniform mixture of ultrafine particles free from primary agglomerated particles can be easily produced.

The gas-current mixing, as referred to in this invention, means mixing achieved by agitation with a gas current.

The mixed ultrafine powder produced by the process of this invention is, for example, a mixture of ultrafine particles of two or more dissimilar metals and ceramics, in a combination of metal-metal, metal-ceramic, or ceramic-ceramic.

The ultrafine metal particles can be produced by the reaction of a molten metal with activated hydrogen. Preferred ultrafine metal particles which can be produced include ultrafine particles of metals of Groups I to IV, Va, VIa, and VIII of the periodic table and alloys alloys thereof, especially metals within the above Groups which have a melting point of not more than about 2,000° C., such as Mg, Al, Si, Sc, Ti, V, Cr, Mn, Fe, Co, Ni, Cu, Zn, Zr, Rh, Pd, Ag, Pt, and Au.

The ceramics include nitride ceramics, carbide ceramics and oxide ceramics. Ultrafine particles of the nitride ceramics can be produced by the reaction of molten metals with activated nitrogen. Preferred nitride ceramics that can be produced include nitrides of B, Al, Si, Ti, Zr, Hf, V, Nb, Ta, Cr, Mo and W. The nitrides of Al, Ti, Zr and Hf are particularly preferred.

Fine particles of the carbide ceramics can be produced by the reaction of molten metal carbides with activated hydrogen. Preferred carbide ceramics that can be produced include carbides of B, Si, Ti, Zr, Hf, V, Nb, Ta, Cr, Mo and W. The carbides of Si, Ti, Hf and W are eepecially preferred.

Ultrafine particles of the oxide ceramics can be produced by the reaction of molten metal oxides with activated hydrogen or by the reaction of molten metals with activated oxygen. Preferred oxide ceramics that can be produced include oxides of Ca, Mg, Zn, Al, Si, Ti, Zr, Sn, Pb, V, Nb, Cr, Mo, W and Co. The oxides of Ca, Mg, Zr, Cr, Mo and W are particularly preferred.

The atmosphere is maintained under a pressure of about 50 torr to 3 atmospheres during the reaction. If the pressure of the atmosphere is lower than 50 torr, the plasmas are difficult to maintain stable, and the rate of generation of the ultrafine particles decreases remarkably. Furthermore, since the total pressure in the atmosphere is low, the mixing of the ultrafine particles by the gas current becomes insufficient. If it is higher than 3 atmosphere, the rate of generation of the ultrafine particles increases. But the resulting ultrafine particles secondarily melt-adhere to each other, and the particle size distribution of the resulting product is greatly broadened. The preferred range of the pressure of the atmosphere is about 400 torr to 1.5 atmospheres. In view of the operability of the process, pressures near atmospheric pressures are best suited.

The reaction of at least two metals or ceramics may be carried out in the same atmosphere using two or more hot plasmas in a single closed vessel, or in different closed vessels.

Any desired gas current agitating mixers, such as a mixer adapted to cause fluidization in a swirling manner, a mixer adapted to perform nonuniform fluidization or a mixer equipped with a riser tube, may be used to perform the gas-current mixing. The use of a mixer capable of forming a swirling flow by centrifugation, such as a cyclone collector, is preferred because it permits easy collection of a mixed ultrafine powder after the gas-current mixing.

The pressure inside the gas-current mixer may be in the range of about 50 torr to 3 atmospheres, but is preferably near atmospheric pressure in view of the efficiency of mixing and operability.

The process of this invention will be described in more detail with reference to the accompanying drawings in which:

FIG. 1 is a simplified, sectional view of an apparatus for producing a mixed ultrafine powder by forming at least two kinds of ultrafine particles simultaneously by a plurality of hot plasmas in a single closed vessel;

FIG. 2 is a simplified, sectional view of an apparatus for producing a mixed ultrafine powder by simultaneously forming at least two types of ultrafine particles by a hot plasma separately in a plurality of closed vessels;

FIG. 8 is a simplified view showing one embodiment of a collector.

Figure 3:
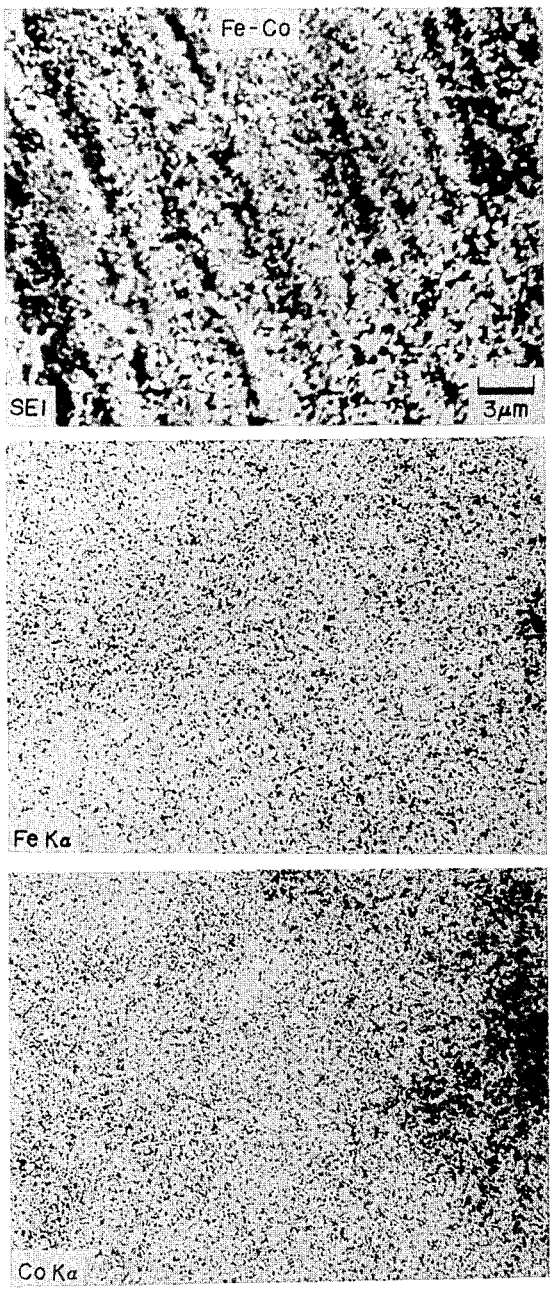
FIG. 3 shows the results of analysis by an X-ray microanalyzer of the composition of the Fe-Co mixed ultrafine powder obtained in Example 1.

With reference to FIG. 1, hot plasmas 3,3' are generated by hot plasma generators 2,2' in a closed vessel 1. The hot plasma generators may, for example, be arc plasma generators or high frequency induction plasma generators. By the hot plasmas 3,3', metals or ceramics 4,4' are heat-melted and hydrogen, nitrogen or oxygen introduced into the vessel 1 through gas inlets 8,8' is activated. Reaction takes place between the activated hydrogen, nitrogen or oxygen and the molten metals or ceramics to form ultrafine particles of the metals or ceramics. The ultrafine particles float in the atmosphere.

The floating ultrafine particles are conveyed to a cyclone-type mixer 6 by a current of the atmospheric gas from the closed vessel 1 and mixed there by the effect of the gas current. The mixture is then collected by a collector 7. The gas current is released from an outlet 9 by means of a pump (not shown). A cooler is provided as indicated at 5 in the closed vessel 1.

When the apparatus shown in FIG. 1 is used, a mixed ultrafine powder of the desired composition can be obtained by properly choosing the composition of the atmosphere in the vessel (e.g., the mixing ratio of hydrogen and nitrogen), the number of samples used (for example, one sample 4 and two samples 4' are used), and the plasma generating conditions for the individual samples (e.g., the current, voltage, etc.).

With reference to FIG. 2, two independent closed vessels 1,1' are provided, and dissimilar metals or ceramics 4,4' are melted separately in the vessels by hot plasmas 3,3' generated by hot plasma generators 2,2'. Hydrogen, nitrogen or oxygen in the atmospheric gases introduced from gas inlets 8,8' is activated by the hot plasmas, and by the reaction of the activated gas with the metals or ceramics, ultrafine particles are formed separately in the vessels 1,1'. The formed ultrafine particles are cooled respectively by coolers 5,5' and conveyed to a mixer 6 where they are mixed by the effect of the gas current. The mixture is then collected by a collector 7. The current gas is released from an outlet 9. In this type of apparatus, the compositions of the atmospheres in the closed vessels 1,1' may be rendered identical or different depending upon the types of the ultrafine particles and the rate of their formation. Furthermore, the composition of the mixed ultrafine particles can be changed as desired by changing the number of closed vessels used (for example, one vessel is used for sample 4, and two vessels for sample 4'), or changing the plasma generating conditions in the individual closed vessels.

The collector may be one comprised of a stepwise arrangement of cyclones as indicated in FIG. 8. In FIG. 8, the reference numeral 10 represents a gas inlet from the mixer; 11, 13, 15, cyclones; 12, 14, 16, collecting sections; 17, a filter; and 9, a gas outlet.

The following Examples illustrate the present invention more specifically.

EXAMPLE 1

The apparatus shown in FIG. 1 was used. Iron (sample 4) and cobalt (sample 4') were simultaneously melted by applying a DC arc (current 140A for each) in an atmosphere of 50% $H_2$-50% Ar (total pressure, 1 atmosphere) to form iron and cobalt ultrafine particles having a particle diameter of less than 0.5 micrometer. These particles were introduced into the cyclone-type mixer and mixed by a gas current. The mixture was collected by the collector to obtain a mixed ultrafine powder of iron-cobalt. The mixure contained 65% Fe and 35% Co.

FIG. 3 shows the results of analysis of the composition of the resulting mixed ultrafine powder by an X-ray microanalyzer. It is seen from the FeK$_\alpha$ image and CoK$_\alpha$ image in FIG. 3 that the mixed state of this mixed ultrafine powder was very good. In FIG. 3, SEI is the secondary electron image of the mixed ultrafine powder, and FeK$_\alpha$ and CoK$_\alpha$ are the characteristic X-ray patterns of Fe and Co, respectively.

EXAMPLE 2

The apparatus shown in FIG. 2 was used. In one closed vessel, silver was used in an atmosphere of 50% $H_2$-50% Ar (total pressure, 1 atmosphere), and in another closed vessel, Ti was used in an atmosphere of 50% $N_2$-50% Ar (total pressure, 1 atmosphere). In the same way as in Example 1, ultrafine particles of silver having a particle diameter of less than 0.5 micrometer and ultrafine particles of titanium nitride having a particle diameter of less than 0.5 were simultaneously formed. They were cooled, and conveyed to the cyclone-type mixer where they were uniformly mixed by a gas current to obtain a mixed ultrafine powder of silver-titanium nitride.

Figure 4:
FIG. 4 shows electronmicrographs of the Ag-TiN mixed ultrafine powder obtained in Example 2.

An electronmicrograph of the resulting mixed ultrafine powder of silver-titanium nitride is shown in FIG. 4. In the photograph, the ultrafine particles of silver were spherical, and the ultrafine titanium nitride particles had a crystal habit such as a rectangle, but the two showed a very good mixed state. The mixed powder consisted of 33% Ag and 67% TiN.

Figure 5:
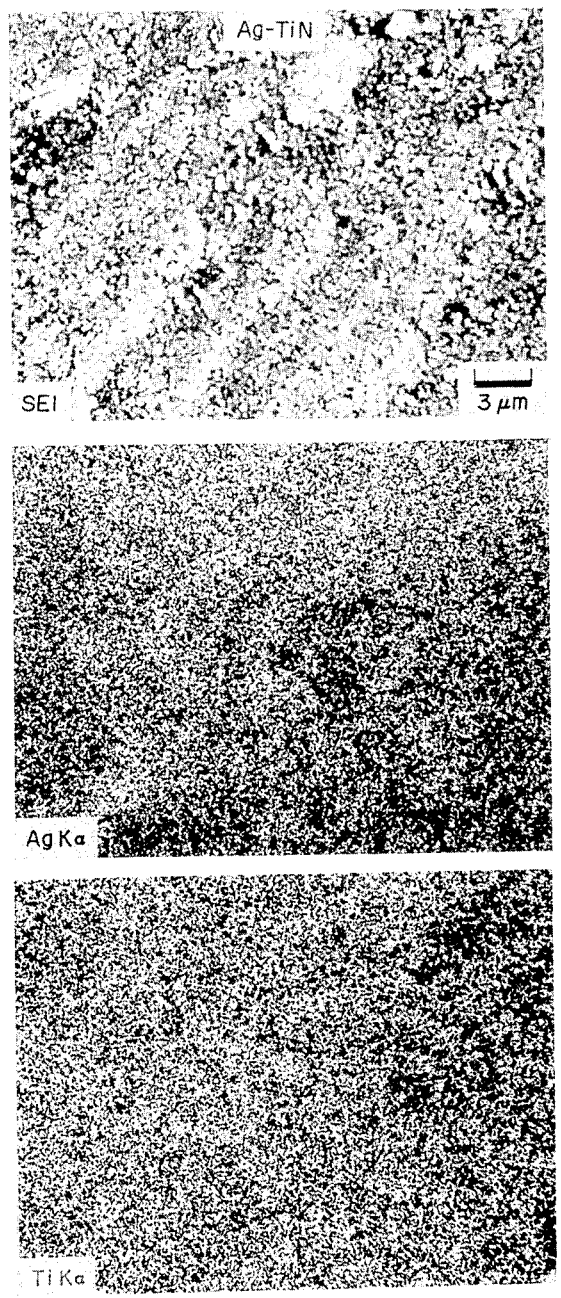
FIG. 5 shows the results of analysis by an X-ray microanalyzer of the composition of the Ag-TiN mixed ultrafine powder obtained in Example 2.

FIG. 5 shows the results of analysis of the composition of the resulting mixed ultrafine Ag-TiN powder by an X-ray microanalyzer. It is seen from FIG. 5 that this mixed ultrafine powder was in a very good mixed state. As in FIG. 3, SEI is the secondary electron image of the mixed ultrafine powder, and $AgK_\alpha$ and $TiK_\alpha$ are the characteristic X-ray patterns of Ag and Ti, respectively.

EXAMPLE 3

The apparatus shown in FIG. 1 was used. Silver and palladium were simultaneously melted by applying a DC arc (current 140A for each) in an atmosphere of 50% $H_2$-50% Ar and in the same way as in Example 1, a mixed ultrafine powder of silver and palladium was prepared.

Figure 6:
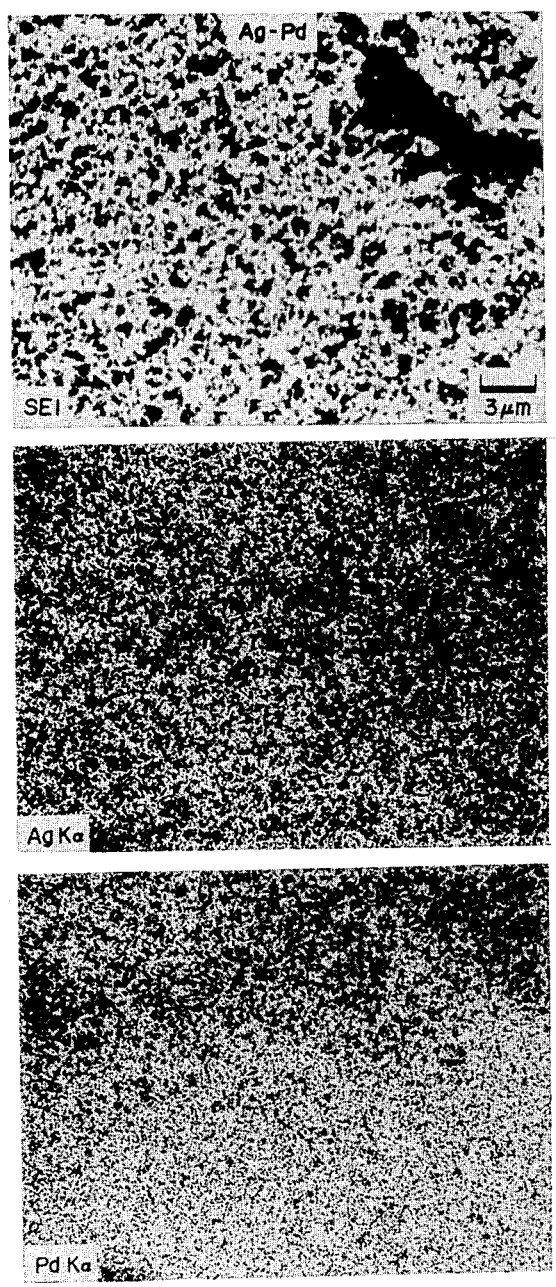
FIG. 6 shows the results of analysis by an X-ray microanalyzer of the composition of the Ag-Pd mixed ultrafine powder obtained in Example 3.

FIG. 6 shows the results of analysis of the resulting mixed ultrafine powder by an X-ray microanalyzer. In FIG. 6, SEI is the secondary electron image of the mixed ultrafine poweder, and $AgK_\alpha$ and $PdK_\alpha$ are the characteristic X-ray patterns of Ag and Pd, respectively, it is seen from FIG. 6 that the mixed state of the resulting mixed ultrafine powder was very good. The mixed ultrafine powder consisted of 70% Ag and 30% Pd.

EXAMPLE 4

The apparatus of FIG. 1 was used. Ni and TiC were simultaneously melted in an atmosphere of 50% $H_2$-50% Ar by applying a DC arc (current 140A for each), and in the same way as in Example 1, a mixed ultrafine powder of Ni and TiC was obtained.

Figure 7:
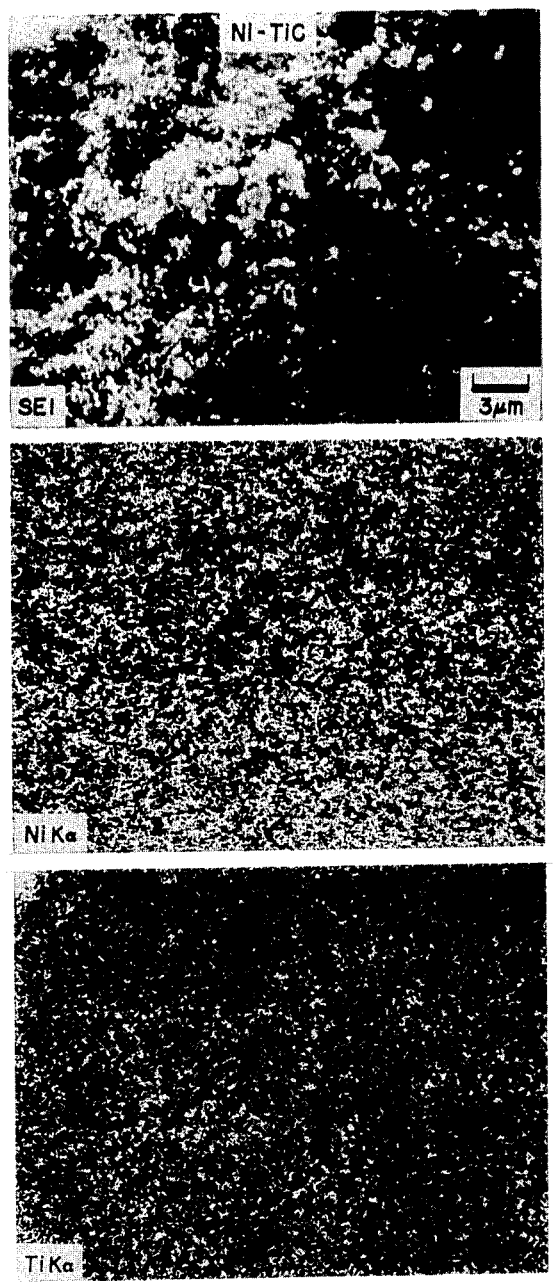
FIG. 7 shows the results of analysis by an X-ray microanalyzer of the Ni-TiC mixed ultrafine powder obtained in Example 4.

FIG. 7 shows the results of analysis of the resulting mixed ultrafine powder by an X-ray microanalyzer. In FIG. 7, SEI is the secondary electron image of the mixed ultrafine powder, and $NiK_\alpha$ and $TiK_\alpha$ are the characteristic X-ray patterns of Ni and Ti. It is seen from FIG. 7 that the mixed state of the resulting mixed ultrafine powder was very good. The mixed ultrafine powder consisted of 90% Ni and 10% TiC.

What is claimed is:

1. A process for producing a mixed ultrafine powder, which comprises reacting at least two metals or ceramics in the molten state with hydrogen, nitrogen, oxygen, a mixture of hydrogen and nitrogen or a mixture of nitrogen and oxygen, each said gas or gaseous mixture being activated with a hot plasma, in an atmosphere of (1) hydrogen gas, (2) nitrogen gas, (3) oxygen gas, (4) a gaseous mixture of hydrogen and nitrogen, (5) a gaseous mixture of nitrogen and oxygen, or (6) a gaseous mixture of any said gases with an inert gas under a pressure of 50 torr to 3 atmospheres to form ultrafine particles of said at least two metals or ceramics afloat in the atmospheric gas in a highly dispersed state with hardly any primary agglomeration, and thereafter mixing the floating ultrafine particles of the metals or ceramics the highly dispersed state by a gas current.

2. The process of claim 1 wherein the formation of the ultrafine particles of at least two metals or ceramics is carried out in the same atmosphere by a plurality of hot plasmas in one closed vessel.

3. The process of claim 1 wherein the formation of the ultrafine particles of at leasst 2 metals or ceramics is carried out in different closed vessels.

* * * * *